US012675701B2

(12) United States Patent
Liu et al.

(10) Patent No.: US 12,675,701 B2
(45) Date of Patent: Jul. 7, 2026

(54) METHOD FOR FEW-SHOT UNSUPERVISED IMAGE-TO-IMAGE TRANSLATION

(71) Applicant: Nvidia Corporation, Santa Clara, CA (US)

(72) Inventors: Ming-Yu Liu, San Jose, CA (US); Xun Huang, New York, NY (US); Tero Karras, Uusimaa (FI); Timo Aila, Helsinki (FI); Jaakko Lehtinen, Uusimaa (FI)

(73) Assignee: NVIDIA Corporation, Santa Clara, CA (US)

( * ) Notice: Subject to any disclaimer, the term of this patent is extended or adjusted under 35 U.S.C. 154(b) by 114 days.

(21) Appl. No.: 16/261,395

(22) Filed: Jan. 29, 2019

(65) Prior Publication Data

US 2020/0242736 A1     Jul. 30, 2020

(51) Int. Cl.
G06N 3/088 (2023.01)
G06F 18/214 (2023.01)
(Continued)

(52) U.S. Cl.
CPC ........... G06N 3/088 (2013.01); G06F 18/214 (2023.01); G06F 18/2431 (2023.01); G06T 3/02 (2024.01);
(Continued)

(58) Field of Classification Search
CPC ...... G06K 9/6256; G06K 9/627; G06K 9/628; G06N 3/0454; G06N 3/084; G06N 3/088;
(Continued)

(56) References Cited

U.S. PATENT DOCUMENTS

| | | | |
|---|---|---|---|
| 9,104,300 B2 | 8/2015 | Brownholtz et al. | |
| 9,940,729 B1 | 4/2018 | Kwant et al. | |

(Continued)

FOREIGN PATENT DOCUMENTS

| | | | | |
|---|---|---|---|---|
| CN | 107292813 | * 10/2017 | .............. | G06K 9/00 |
| CN | 108108674 A | 6/2018 | | |

(Continued)

OTHER PUBLICATIONS

Tran et al., "Disentangled Representation Learning GAN for Pose-Invariant Face Recognition", 2017, IEEE Computer Society, pp. 1283-1292 (Year: 2017).*

(Continued)

*Primary Examiner* — Stephen R Koziol
(74) *Attorney, Agent, or Firm* — Davis Wright Tremaine LLP

(57)          ABSTRACT

A few-shot, unsupervised image-to-image translation ("FUNIT") algorithm is disclosed that accepts as input images of previously-unseen target classes. These target classes are specified at inference time by only a few images, such as a single image or a pair of images, of an object of the target type. A FUNIT network can be trained using a data set containing images of many different object classes, in order to translate images from one class to another class by leveraging few input images of the target class. By learning to extract appearance patterns from the few input images for the translation task, the network learns a generalizable appearance pattern extractor that can be applied to images of unseen classes at translation time for a few-shot image-to-image translation task.

21 Claims, 7 Drawing Sheets

(51) Int. Cl.

| | |
|---|---|
| *G06F 18/2431* | (2023.01) |
| *G06T 3/02* | (2024.01) |
| *G06T 3/60* | (2024.01) |
| *G06T 7/73* | (2017.01) |
| *G06V 10/764* | (2022.01) |
| *G06V 10/82* | (2022.01) |

(52) U.S. Cl.
CPC .................. *G06T 3/60* (2013.01); *G06T 7/74* (2017.01); *G06V 10/764* (2022.01); *G06V 10/82* (2022.01); *G06T 2207/20081* (2013.01); *G06T 2207/20084* (2013.01)

(58) Field of Classification Search
CPC .................... G06N 7/005; G06T 11/60; G06T 2207/20081; G06T 2207/20084; G06T 3/0006; G06T 3/60; G06T 7/74; G06V 10/764; G06V 10/82
See application file for complete search history.

(56) References Cited

U.S. PATENT DOCUMENTS

| | | | |
|---|---|---|---|
| 10,325,230 B2 | 6/2019 | Brandon et al. | |
| 10,445,622 B2 | 10/2019 | Kicanaoglu et al. | |
| 10,474,881 B2 | 11/2019 | Yu et al. | |
| 10,540,757 B1 * | 1/2020 | Bouhnik | G06N 3/0454 |
| 10,970,830 B2 | 4/2021 | Zhang et al. | |
| 11,080,918 B2 | 8/2021 | Chen et al. | |
| 2016/0125572 A1 | 5/2016 | Yoo et al. | |
| 2018/0039853 A1 | 2/2018 | Liu et al. | |
| 2018/0075581 A1 | 3/2018 | Shi et al. | |
| 2018/0247201 A1 | 8/2018 | Liu et al. | |
| 2018/0260663 A1 | 9/2018 | Kim et al. | |
| 2018/0293737 A1 | 10/2018 | Sun et al. | |
| 2018/0314716 A1 * | 11/2018 | Kim | G06T 11/00 |
| 2018/0336434 A1 | 11/2018 | Kicanaoglu et al. | |
| 2019/0028741 A1 | 1/2019 | Davies | |
| 2019/0057509 A1 | 2/2019 | Lv et al. | |
| 2019/0066313 A1 | 2/2019 | Kim et al. | |
| 2019/0080205 A1 * | 3/2019 | Kaufhold | G06K 9/6257 |
| 2019/0114511 A1 * | 4/2019 | Gao | G06N 3/048 |
| 2019/0114547 A1 * | 4/2019 | Jaganathan | G06N 3/047 |
| 2019/0279075 A1 | 9/2019 | Liu et al. | |
| 2019/0371080 A1 * | 12/2019 | Sminchisescu | G06T 17/20 |
| 2020/0065629 A1 * | 2/2020 | Kennedy | G06F 18/217 |
| 2020/0159246 A1 | 5/2020 | Cui et al. | |
| 2020/0167993 A1 | 5/2020 | Chen et al. | |
| 2020/0219006 A1 | 7/2020 | Wang | |
| 2020/0265219 A1 | 8/2020 | Liu et al. | |
| 2020/0286273 A1 | 9/2020 | Chen | |
| 2020/0304804 A1 | 9/2020 | Habibian et al. | |
| 2021/0232803 A1 | 7/2021 | Fu et al. | |
| 2021/0241500 A1 | 8/2021 | Chen et al. | |
| 2021/0262807 A1 | 8/2021 | Chen et al. | |
| 2022/0019844 A1 | 1/2022 | Park et al. | |
| 2022/0044352 A1 * | 2/2022 | Liao | G06N 20/20 |

FOREIGN PATENT DOCUMENTS

| | | | |
|---|---|---|---|
| CN | 109712068 A | 5/2019 | |
| CN | 109753992 A | 5/2019 | |
| CN | 110097103 A | 8/2019 | |
| CN | 110189249 A | 8/2019 | |
| CN | 110473141 A | 11/2019 | |
| CN | 110659570 A | 1/2020 | |
| CN | 110738153 A | 1/2020 | |
| CN | 110796593 A | 2/2020 | |
| CN | 107562805 B | 4/2020 | |
| CN | 110992252 A | 4/2020 | |
| CN | 111652796 A | 9/2020 | |
| CN | 111667399 A | 9/2020 | |
| CN | 111753824 A | 10/2020 | |
| CN | 112669202 A | 4/2021 | |
| CN | 115049841 A | 9/2022 | |
| CN | 110998604 B | 10/2023 | |
| GB | 2591534 A | 8/2021 | |
| KP | 2016-00384405 A | 4/2016 | |
| WO | 2020159935 A1 | 8/2020 | |

OTHER PUBLICATIONS

Huang et al., "Arbitrary Style Transfer in Real-Time With Adaptive Instance Normalization", 2017, https://openreview.net/pdf?id=B1fUVMzKg (Year: 2017).*

Springenberg, "Unsupervised And Semi-Supervised Learning With Categorical Generative Adversarial Networks", 2016, conference paper at ICLR 2016 (Year: 2016).*

Siarohin et al., "Deformable GANs for Pose-based Human Image Generation", Apr. 2018, arXiv.org (Year: 2018).*

International Search Report and Written Opinion issued in PCT Application No. PCT/US20/15262 dated May 14, 2020.

Preliminary Report on Patentability issued in PCT Application No. PCT/US20/15262 dated Jul. 27, 2021.

Tran Luan et al: "Disentangled Representation Learning GAN for Pose-Invariant Face Recognition", IEEE Computer Society Conference on Computer Vision and Pattern Recognition. Proceedings, IEEE Computer Society, us, Jul. 21, 2017 (Jul. 21, 2017), pp. 1283-1292, XP033249467, ISSN: 1063-6919, DOI: 10.1109/CVPR. 2017.141 [retrieved on Nov. 6, 2017] Abstract section 1. par. 3, first sentence section 1. par. 3, lines 9-11 section 1. par. 4, lines 2-6 and 10-12 section 1. par. 5, lines 12-13 section 1. par. 6, lines 4-6 section 3.3, lines 2-3 after equation (6)] section 3.4, last sentence section 4.1, par. 1; p. 1; figure 1.

Xun Huang et al: "Workshop track-I CLR 2017 Arbitrary Style Transfer in Real-Time With Adaptive Instance Normalization", Dec. 31, 2017 (Dec. 31, 2017), XP055691247, Retrieved from the Internet: URL:https://openreview.net/pdf?id=B1fUVMzK g [retrieved on May 4, 2020] section 1, par. 3, lines 6-10 section 3, par. 2, lines 1-6 section 5.1, par. 1, lines 4-7.

Zhang et al., "Self-Attention Generative Adversarial Networks," May 21, 2018, 10 pages.

Zhang et al., "The Unreasonable Effectiveness of Deep Features as a Perceptual Metric," CVPR, 2018, 10 pages.

Zhu et al., "Unpaired Image-to-Image Translation Using Cycle-Consistent Adversarial Networks," In Proceedings of the IEEE International Conference on Computer Vision, 2017, 10 pages.

Office Action for United Kingdom Application No. GB112269.2, mailed Aug. 24, 2022, 6 pages.

Tran et al., "Disentangled Representation Learning GAN for Pose-Invariant Face Recognition," CVPR, 2017, 10 pages.

Anoosheh et al., "ComboGAN: Unrestrained Scalability for Image Domain Translation," Dec. 19, 2017, 7 pages.

Benaim et al., "One-shot unsupervised cross domain translation," Advances in Neural Information Processing Systems, 2018, 14 pages.

Benaim et al., "One-Sided Unsupervised Domain Mapping," Advances in Neural Information Processing Systems, 2017, 11 pages.

Bousmalis et al., "Unsupervised Pixel-Level Domain Adaptation with Generative Adversarial Networks", In IEEE Conference on Computer Vision and Pattern Recognition, Aug. 23, 2017, 15 pages.

Chen et al. "Photographic Image Synthesis with Cascaded Refinement Networks", arXiv:707.09405v1, dated Jul. 28, 2017, 10 pages.

Choi et al., "Stargan: Unified Generative Adversarial Networks for Multi-Domain Image-to-Image Translation," In Proceedings of the IEEE Conference on Computer Vision and Pattern Recognition, 2018, 9 pages.

Deng et al., "Imagenet: A Large-Scale Hierarchical Image Database," CVPR, 2009, 8 pages.

Dixit et al., "AGA: Attribute-Guided Augmentation," IEEE Conference on Computer Vision and Pattern Recognition, 2017, 9 pages.

Fei-Fei et al., "One-Shot Learning of Object Categories," IEEE Transactions on Pattern Analysis and Machine Intelligence, 2006, 18 pages.

(56) References Cited

OTHER PUBLICATIONS

Finn et al., "Model-Agnostic Meta-Learning for Fast Adaptation of Deep Networks," Jul. 18, 2017, 13 pages.

Girshick, "Fast R-CNN," In IEEE Conference on Computer Vision and Pattern Recognition, 2015, 9 pages.

Goodfellow et al., "Generative Adversarial Nets," In Advances in Neural Information Processing Systems, Jun. 10, 2014, 9 pages.

Hariharan et al., "Low-Shot Visual Recognition by Shrinking and Hallucinating Features," IEEE International Conference on Computer Vision, 2017, 10 pages.

He et al., "Deep Residual Learning for Image Recognition," CVPR, 2016, 9 pages.

Heusel et al., "GANs Trained by a Two Time-scale Update Rule Converge to a Local Nash Equilibrium," Advances in Neural Information Processing Systems, 2017, 12 pages.

Huang et al., "Multimodal Unsupervised Image-to-Image Translation," In Proceedings of the European Conference on Computer Vision (ECCV), 2018, 18 pages.

Hui et al., "Unsupervised Multi-Domain Image Translation with Domain-Specific Encoders/Decoders," Dec. 6, 2017, 9 pages.

Isola et al., "Image-to-Image Translation with Conditional Adversarial Networks", IEEE Conference on Computer Vision and Pattern Recognition, 2017, 10 pages.

Johnson et al., "Perceptual Losses for Real-Time Style Transfer and Super-Resolution," Department of Computer Science, 2016, 17 pages.

Karras et al., "Progressive Growing of GANs for Improved Quality, Stability, and Variation," ICLR, 2018, 26 pages.

Kim et al., "Learning to Discover Cross-Domain Relations with Generative Adversarial Networks," ICML, 2017, 9 pages.

Larsen et al., "Autoencoding Beyond Pixels using a Learned Similarity Metric," International Conference on Machine earning, 2016, 9 pages.

Lee et al., "Diverse Image-to-Image Translation via Disentangled Representations," ECCV, 1(3): 2018, 17 pages.

Li et al., "Revisiting Batch Normalization for Practical Domain Adaptation," Nov. 8, 2016, 12 pages.

Lim et al., "Geometric GAN," May 9, 2017, 17 pages.

Liu et al., "Coupled Generative Adversarial Networks," 30th Conference on Neural Information Processing, Dec. 5, 2016, 9 pages.

Liu et al., "Deep Learning Face Attributes in the Wild," ICCV, 2015, 9 pages.

Liu et al., "Unsupervised Image-to-Image Translation Networks," Oct. 9, 2017, 11 pages.

Mescheder et al., "Which Training Methods for GANs do actually Converge?," Jul. 31, 2018, 39 pages.

Miyato et al., "Spectral Normalization for Generative Adversarial Networks," ICLR, 2018, 26 pages.

Munkhdalai et al., "Meta Networks," In International Conference on Machine Learning, 2017, 10 pages.

Nair et al., "Rectified Linear Units Improve Restricted Boltzmann Machines," International Conference on Machine Learning, 2010, 8 pages.

Nichol et al., "On First-Order Metalearning Algorithms," Oct. 22, 2018, 15 pages.

Paszke et al., "Automatic Differentiation in Pytorch," 2017, 4 pages.

Ravi et al., "Optimization as a Model for Few-Shot Learning," ICLR, 2017, 11 pages.

Salakhutdinov et al., "One-Shot Learning with a Hierarchical Nonparametric Bayesian Model," International Conference on Machine Learning, 2012, 13 pages.

Salimans et al., "Improved Techniques for Training GANs," Advances in Neural Information Processing Systems, 2016, 9 pages.

Shrivastava et al., "Learning from Simulated and Unsupervised Images through Adversarial Training," 2017 IEEE Conference on Computer Vision and Pattern Recognition (CVPR), Jul. 21, 2017, 10 pages.

Simonyan et al., "Very Deep Convolutional Networks for Large-Scale Image Recognition," Apr. 10, 2015, 14 pages.

Snell et al., "Prototypical Networks for Few-Shot Learning," Advances in Neural Information Processing Systems, 2017, 11 pages.

Sung et al., "Learning to Compare: Relation Network for Few-Shot Learning," IEEE Conference on Computer Vision and Pattern Recognition, 2018, 10 pages.

Szegedy et al., "Rethinking the Inception Architecture for Computer Vision," CVPR, 2016, 9 pages.

Taigman et al., "Unsupervised Cross-Domain Image Generation," Nov. 7, 2016, 14 pages.

Ulyanov et al., "Instance Normalization: The Missing Ingredient for Fast Stylization," Nov. 6, 2017, 6 pages.

Van Horn et al., "Building a Bird Recognition App and Large Scale Dataset with Citizen Scientists: The Fine Print in Fine-Grained Dataset Collection," IEEE Conference on Computer Vision and Pattern Recognition, 2015, 10 pages.

Vinyals et al., "Matching Networks for One Shot Learning," Advances in Neural Information Processing Systems, 2016, 9 pages.

Wang et al., "High-Resolution Image Synthesis and Semantic Manipulation with Conditional GANs", In IEEE Conference on Computer Vision and Pattern Recognition, Aug. 20, 2018, 10 pages.

Wang et al., "Low-Shot Learning from Imaginary Data," Proceedings of the IEEE Conference on Computer Vision and pattern Recognition, 2018, 9 pages.

Wang et al., "Video-to-Video Synthesis," Advances in Neural Information Processing Systems, 2018, 13 pages.

Yi et al., "DualGAN: Unsupervised Dual Learning for Image-to-Image Translation," IEEE International Conference on Computer Vision, 2017, 9 pages.

Combined Search and Examination Report for United Kingdom Application No. GB2307740.7, mailed Jun. 23, 2023, 7 pages.

Ulyanov et al., "Improved Texture Networks: Maximizing Quality and Diversity in Feed-forward Stylization and Texture Synthesis," Nov. 6, 2017, 9 Pages.

Office Action for United Kingdom Application No. GB2112269.2, mailed Aug. 17, 2023, 6 pages.

Esser et al., "A Variational U-Net for Conditional Appearance and Shape Generation," IEEE/CVF Conference on Computer Vision and Pattern Recognition, 2018, 21 pages.

Office Action for United Kingdom Application No. GB2112269.2, mailed May 12, 2023, 6 pages.

Pumarola et al., "Unsupervised Person Image Synthesis in Arbitrary Poses," IEEE/CVF Conference on Computer Vision and Pattern Recognition, Jun. 18, 2018, 9 pages.

Zanfir et al., "Human Appearance Transfer," IEEE/CVF Conference on Computer Vision and Pattern Recognition, 2018, 9 pages.

Office Action for Chinese Application No. 202080011323.4, mailed Jan. 10, 2024, 24 pages.

Office Action for United Kingdom Application No. GB2307740.7, mailed Oct. 13, 2023, 4 pages.

Miyato et al., "cGANs with Projection Discriminator," ICLR, 2018, 23 pages.

Notification to Grant Patent Right for Chinese Application No. 202080011323.4, mailed Oct. 24, 2024, 7 pages.

Novak et al., "Improving the Neural Algorithm of Artistic Style," 2016, 15 pages.

Office Action for Chinese Application No. 202080011323.4, mailed Jul. 24, 2024, 15 pages.

Office Action for Chinese Application No. 202110535804.1, mailed Jan. 15, 2025, 19 pages.

Office Action for Chinese Application No. 202110535804.1, mailed Jul. 10, 2024, 23 pages.

Office Action for Chinese Application No. 202110535804.1, mailed Oct. 17, 2025, 30 pages.

Office Action for United Kingdom Application No. GB2106933.1, mailed Jun. 12, 2024, 3 pages.

Office Action for United Kingdom Application No. GB2307740.7, mailed Dec. 5, 2023, 2 pages.

Park et al., "Semantic Image Synthesis with Spatially Adaptive Normalization," CVPR, 2019, 10 pages.

Pumarola et al., "Ganimation: Anatomically-Aware Facial Animation from a Single Image," European Conference on Computer Vision, Aug. 28, 2018, 16 pages.

(56)         References Cited

OTHER PUBLICATIONS

Qi et al., "Semi-parametric Image Synthesis", IEEE Conference on Computer Vision and Pattern Recognition, 2018, 9 pages.
Qiu, "Research on Human Pose Estimation Based on Static Image," University of Electronic Science and Technology of China, Sep. 15, 2018, 76 pages.
Shen et al., "Towards Instance-Level Image-to-Image Translation," IEEE Conference on Computer Vision and Pattern Recognition, 2019, 10 pages.
Siarohin et al., "Animating Arbitrary Objects via Deep Motion Transfer," IEEE Conference on Computer Vision and Pattern Recognition, 2019, 10 pages.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.
Taigman et al., "Unsupervised Cross-Domain Image Generation," arXiv: 1611.02200, dated Nov. 7, 2016, 14 pages.
Tian et al., "Image Semantic Segmentation Technology Based on Deep Learning," Beijing: Ocean Press, Dec. 2019, 5 pages.
United Kingdom Combined Search and Examination Report for Patent Application No. 2106933.1 dated Nov. 5, 2021, 6 pages.
Wang et al., "Discriminative Region Proposal Adversarial Networks for High-Quality Image-to-Image Translation," European Conference on Computer Vision, 2018, 16 pages.
Wang et al., "Example-Guided Style-Consistent Image Synthesis from Semantic Labeling," IEEE Conference on Computer Vision and Pattern Recognition, 2019, 10 pages.
Albahar et al., "Guided Image-to-Image Translation with Bi-directional Feature Transformation," IEEE Conference on Computer Vision and Pattern Recognition, 2019, 10 pages.
Chen et al., "Rethinking Atrous Convolution for Semantic Image Segmentation," arXiv:1706.05587, dated Dec. 5, 2017, 14 pages.
Choi et al., "StarGAN v2: Diverse Image Synthesis for Multiple Domains," IEEE Conference on Computer Vision and Pattern Recognition, 2020, 10 pages.
Decision of Rejection for Chinese Application No. 202110535804.1, mailed Apr. 8, 2025, 26 pages.
Deng et al. "Imagenet: A Large-Scale Hierarchical Image Database," ICLR, 2009, 8 pages.
Everingham et al., "The PASCAL Visual Object Classes Challenge (VOC2012) Results," 2012, 34 pages.
Gatys et al., "Texture Synthesis using Convolutional Neural Networks," Advances in Neural Information Processing Systems, May 27, 2015, 9 pages.
Gokaslan et al., "Improving Shape Deformation in Unsupervised Image-to-Image Translation," European Conference on Computer Vision, 2018, 17 pages.
Gu et al., "LADN: Local Adversarial Disentangling Network for Facial Makeup and De-makeup," ICCV, 2019, 10 pages.
Gulrajani et al., "Improved Training of Wasserstein GANs," Advances in Neural Information Processing Systems, 2017, 17 pages.
Han et al., "VITON: An Image-Based Virtual Try-on Network," IEEE Conference on Computer Vision and Pattern Recognition, 2018, 10 pages.
Heusel et al., "GANs Trained by a Two Time-Scale Update Rule Converge to a Local Nash Equilibrium," Nov. 8, 2017, 38 pages.

Ieee, "IEEE Standard 754-2008 (Revision of IEEE Standard 754-1985): IEEE Standard for Floating-Point Arithmetic," Aug. 29, 2008, 70 pages.
Karras et al., "A Style-Based Generator Architecture for Generative Adversarial Networks," CVPR, 2019, 10 pages.
Karras et al., "Progressive Growing of GANs for Improved Quality, Stability, and Variation," Machine Learning, Oct. 2017, 26 pages.
Kingma et al. "Adam: A Method for Stochastic Optimization," arXiv: 1412.6980, dated Dec. 22, 2014, 9 pages.
Lee et al., "Diverse Image-to-Image Translation via Disentangled Representations," European Conference on Computer Vision, 2018, 17 pages.
Li et al., "Universal Style Transfer via Feature Transforms," Advances in Neural Information Processing Systems, 2017, 11 pages.
Liang et al., "Dual Motion GAN for Future-ow Embedded Video Prediction," Advances in Neural Information Processing Systems, 2017, 9 pages.
Liu et al., "Few-Shot Unsupervised Image-to-Image Translation," ICCV, 2019, 10 pages.
Liu et al., "Learning to Predict Layout-to-Image Conditional Convolutions for Semantic Image Synthesis," Advances in Neural Information Processing Systems, 2019, 11 pages.
Mao et al., "Least Squares Generative Adversarial Networks," ICCV, 2017, 9 pages.
Wang et al., "Few-Shot Video-to-Video Synthesis," Advances in Neural Information Processing Systems, Oct. 28, 2019, 14 pages.
Wang et al., "Video-to-Video Synthesis," Neural Information Processing Systems, 2018, 13 pages.
Zakharov et al., "Few-Shot Adversarial Learning of Realistic Neural Talking Head Models," ICCV, 2019, 21 pages.
Zhao et al., "Image Generation from Layout," IEEE Conference on Computer Vision and Pattern Recognition, Oct. 14, 2019, 10 pages.
Zhu et al., "Be Your Own Prada: Fashion Synthesis with Structural Coherence," IEEE International Conference on Computer Vision, 2017, 9 pages.
Zhu et al., "Toward Multimodal Image-to-Image Translation," Neural Information Processing Systems, 2017, 12 pages.
Donahue et al., "Semantically Decomposing the Latent Spaces of Generative Adversarial Networks," ICLR, 2018, 19 pages.
Gulrajani et al., "Improved Training of Wasserstein GANs," NIPS'17: Proceedings of the 31st International Conference on Neural Information Processing Systems, 5769-5779, 2017, 11 pages.
Huang et al., "Beyond Face Rotation: Global and Local Perception GAN for Photorealistic and Identity Preserving Frontal View Synthesis," ICCV, 2017, 10 pages.
Li et al., "WaterGAN: Unsupervised Generative Network to Enable Real-time Color Correction of Monocular Underwater Images," IEEE Robotics and Automation Letters, 2017, 8 pages.
Liang et al., "Recurrent Topic-Transition GAN for Visual Paragraph Generation," ICCV, 2017, 10 pages.
Peng et al., "Reconstruction-Based Disentanglement for Pose-invariant Face Recognition," ICCV, 2017, 10 pages.
Perarnau et al., "Invertible Conditional GANs for Image Editing," 2016, 9 pages.
Wang et al., "Generative Adversarial Networks: Introduction and Outlook," IEEE/CAA Journal of Automatica Sinica, 4(4): Oct. 2017, 11 pages.
Yin et al., "Towards Large-Pose Face Frontalization in the Wild," ICCV, 2017, 10 pages.
Yu et al., "GaitGAN: Invariant Gait Feature Extraction Using Generative Adversarial Networks," CVPR, 2017, 8 pages.
Zhang et al., "Age Progression/Regression by Conditional Adversarial Autoencoder," CVPR, 2017, 9 pages.
Zhao et al., "Dual-Agent GANs for Photorealistic and Identity Preserving Profile Face Synthesis," Conference on Neural Information Processing Systems, 2017, 11 pages.

* cited by examiner

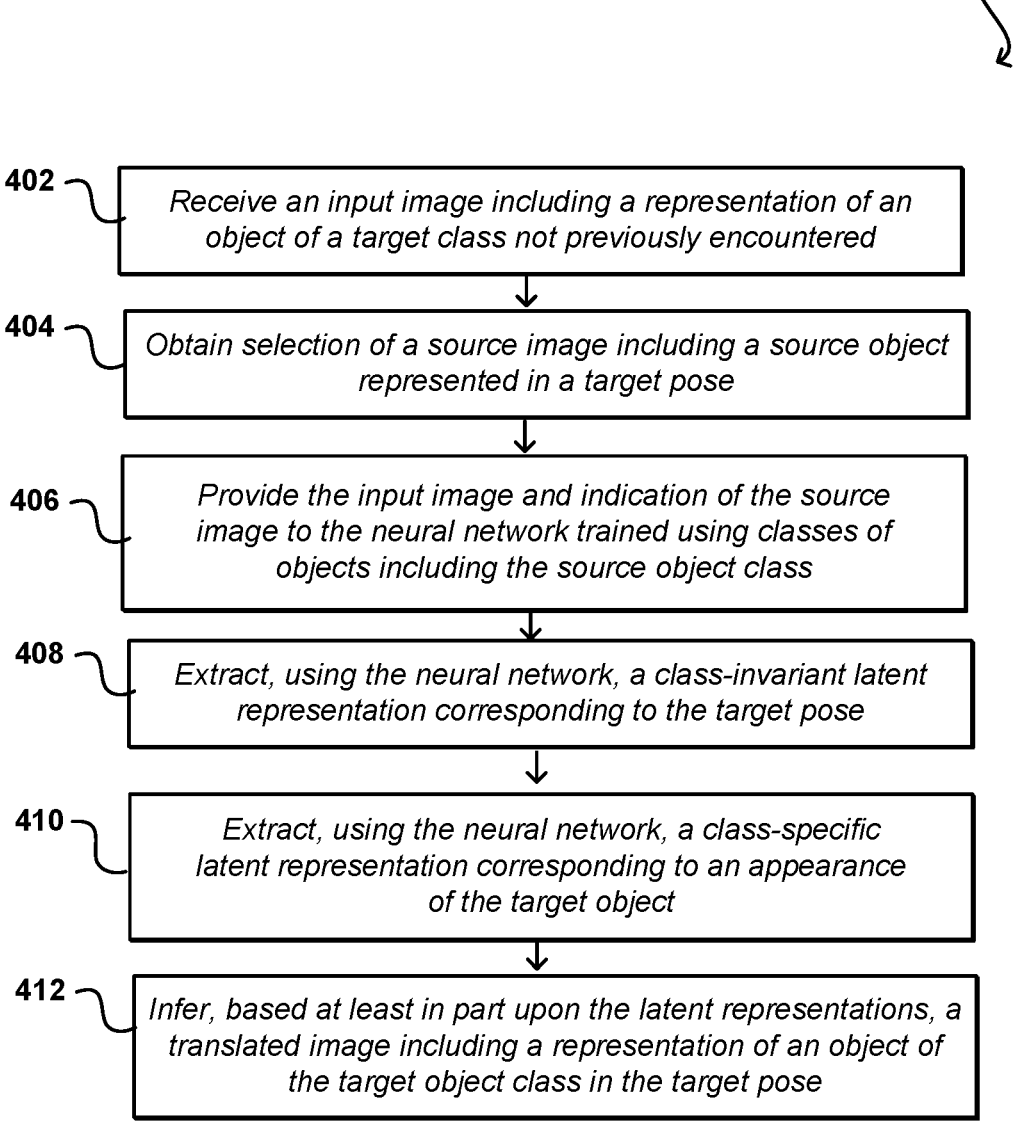

400

402 — Receive an input image including a representation of an object of a target class not previously encountered 404 — Obtain selection of a source image including a source object represented in a target pose 406 — Provide the input image and indication of the source image to the neural network trained using classes of objects including the source object class 408 — Extract, using the neural network, a class-invariant latent representation corresponding to the target pose 410 — Extract, using the neural network, a class-specific latent representation corresponding to an appearance of the target object 412 — Infer, based at least in part upon the latent representations, a translated image including a representation of an object of the target object class in the target pose

Input Layer 602

Output Layer 606

Unclassified

Inferences

Intermediate Layers 604

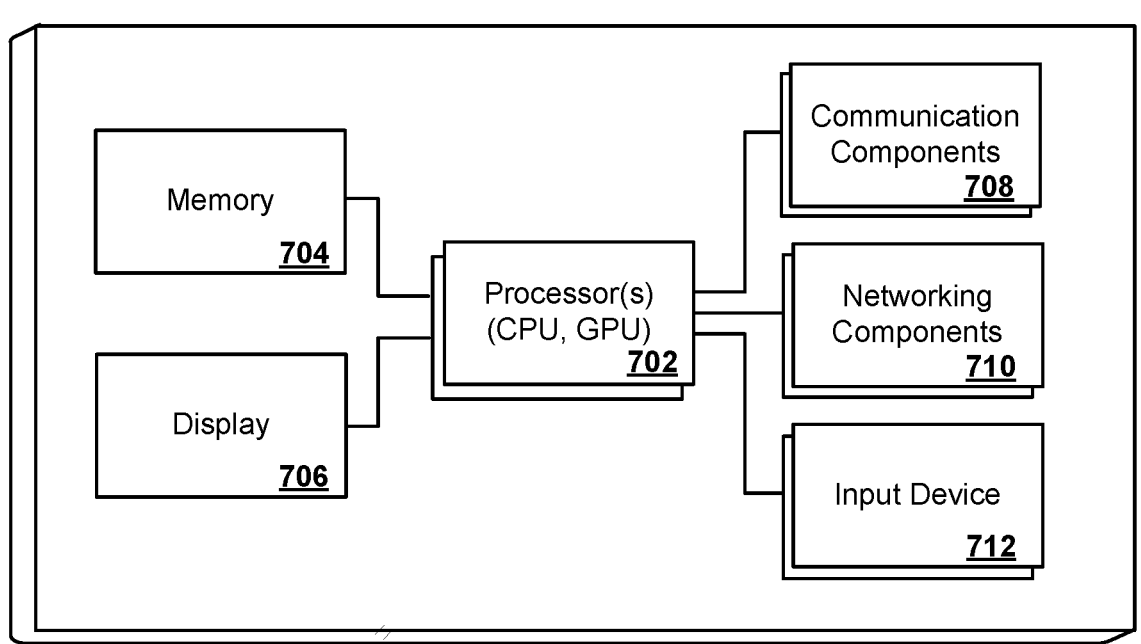
FIG. 7

METHOD FOR FEW-SHOT UNSUPERVISED IMAGE-TO-IMAGE TRANSLATION

BACKGROUND

Advances in processing power and image manipulation software have enabled an increasing variety of image creation and manipulation capabilities. For example, an image of a first type of object can be used to generate an image showing the first type of object having an aspect of a second type of object. In order to accomplish such generation, however, a user either has to manually generate or manipulate an image, or has to provide a large number of input images of the first type of object that enable adequate generation of the target image. This may be complex and time consuming in the case of manual generation, and may not be practical in situations where a user might only have one or two images of the first type of object.

BRIEF DESCRIPTION OF THE DRAWINGS

Various embodiments in accordance with the present disclosure will be described with reference to the drawings, in which:

FIG. 4 illustrates an example process for performing an image translation in accordance with various embodiments.

FIG. 7 illustrates example components of a computing device that can be used to implement aspects of the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the generation of images including representations of objects having one or more specific aspects. In particular, various embodiments provide a few-shot, unsupervised image-to-image translation ("FUNIT") algorithm that works on previously-unseen target classes that are specified, at inference time, only by a few example images, such as a single image or a pair of input images of an object of the target type. A FUNIT network can be trained using a data set containing images of many different object classes, in order to translate images from one class to another class by leveraging few input images of the target class. By learning to extract appearance patterns from the few input images for the translation task, the network learns a generalizable appearance pattern extractor that can be applied to images of unseen classes at translation time for a few-shot image-to-image translation task.

Various other functions can be implemented within the various embodiments as well as discussed and suggested elsewhere herein.

Figure 1:
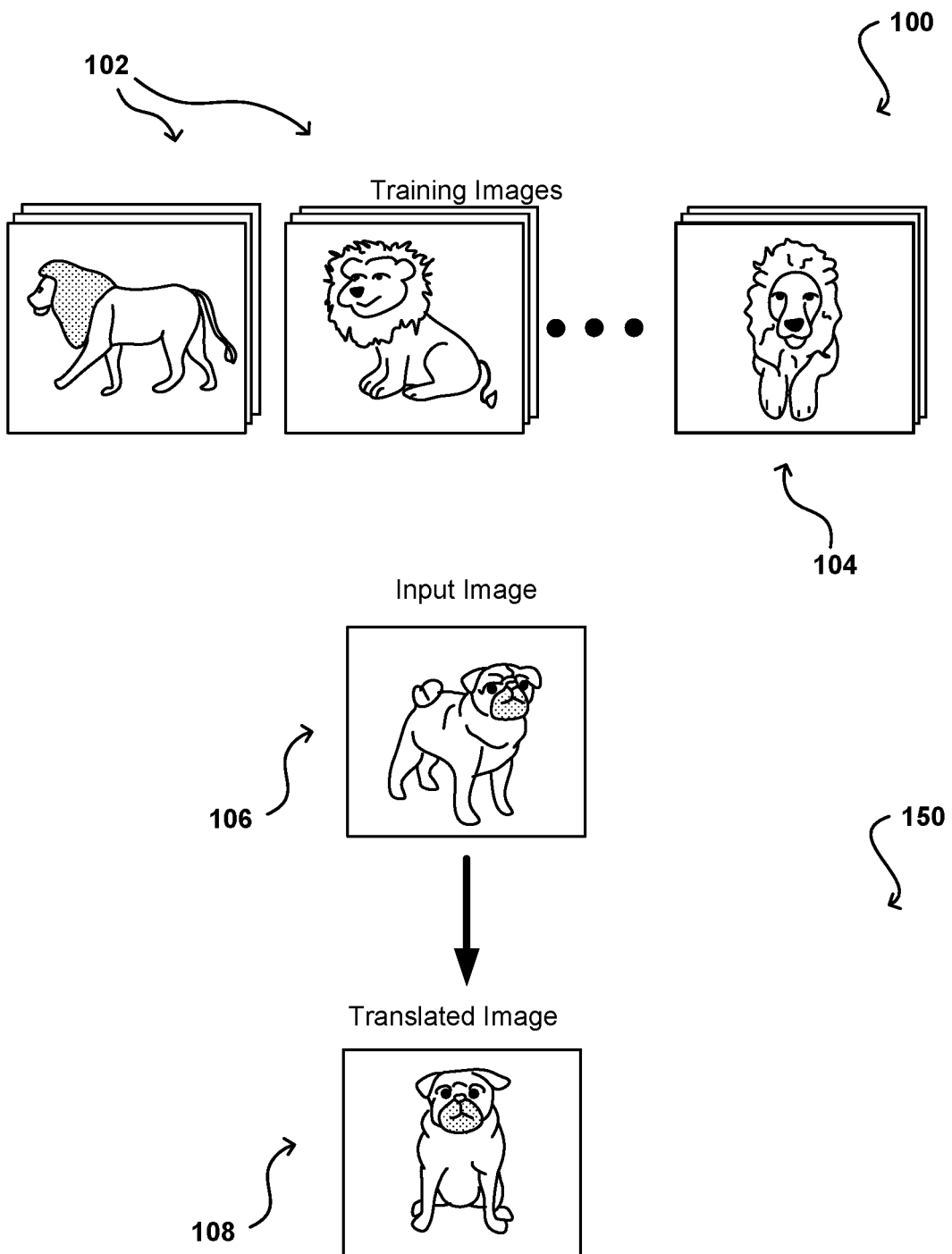
FIG. 1 illustrates an example image translation that can be performed in accordance with various embodiments.

FIG. 1 illustrates an example image translation 100 that can be performed in accordance with various embodiments. The translation can accept an input image 106 (or a digital representation of an image) including a representation of a type of object, in this case a breed of dog corresponding to a pug. It might be desired to generate an image of the pug in a different pose, such as to translate the representation of the pug from the pose of the target image 106 to a target pose, such as the pose in a selected or provided image 104. As illustrated, the image with the target pose includes a representation of a different type of object, in this example a lion. The image translation can take what it has learned from images of lions (and other such object classes) and use that learning to generate an image 108 of a pug exhibiting the target pose. Of interest in this example is the fact that the image translation network has been trained using images 102 of many classes of object types, including many images of the lion object type. The image translation network has not previously been trained on, or processed, any images including a representation of a pug.

Approaches in accordance with various embodiments can perform such an image generation, or translation as referred to herein, using one or more image-to-image translation methods. In various embodiments, unsupervised image-to-image translation techniques can be used that learn to map images in a given class to an analogous image in a different class, drawing on unstructured (i.e., non-registered) datasets of images. While some conventional approaches can provide images with translations in object pose, these approaches require access to many images in both the source class (e.g., exhibiting the target pose) and the destination class (including the previously unseen object to obtain the desired pose) either during training or at the time for translation. The need for a large number of input images of the desired object class greatly limits the usefulness of these conventional approaches. Drawing inspiration from the human capability of picking up the essence of a novel object from a small number of examples and generalizing from there, approaches in accordance with various embodiments utilize a few-shot, unsupervised image-to-image translation algorithm that works on previously unseen target classes that are specified, at translation time, only by a few example images, such as a single image or a pair of input images of an object of the target type. In some embodiments the algorithm utilizes three or less, while in other embodiments such an algorithm can work with less than five input images of the target class. In some embodiments a single image can be used, but accuracy or photorealism may be increased using a second or third image of the target object class in different poses. An example model achieves this few-shot imagination capability by coupling an adversarial training scheme with a novel network design.

As mentioned, the human brain is remarkably good at generalization. When given a picture of a previously-unseen type of animal, for example, the human brain can form a vivid mental picture of the previously-unseen animal in various poses, particularly when that human has been exposed to images or views of similar, but different, animals in those poses before. For example, a person seeing a standing pug for the first time (as illustrated in the example input image 106 of FIG. 1) will have little to no trouble imagining what the pug would look like sitting on its hind legs (as in the example output image 108) or lying down, given a lifetime of experience of other animals in similar poses and how those animals appear in those poses.

While some conventional unsupervised image-to-image translation algorithms provide reasonable results in transferring complex appearance changes across image classes, the capability to generalize from a few samples of a new class based on prior knowledge is not possible using these algorithms. Concretely, these algorithms require large training sets over all classes of images on which translation is to be performed, and these algorithms do not support few-shot generalization.

Approaches in accordance with various embodiments attempt to bridge the gap between human and machine imagination capability using what is referred to herein as a Few-shot UN-supervised Image-to-image Translation ("FUNIT") framework. A FUNIT framework can learn an image-to-image translation model for mapping an image of a source class to an analogous image of a target class by leveraging few images (i.e., two or less) of the target class given at the time for translation. The translation model may never have encountered or processed images of the target class, during training or otherwise, but is asked to generate some of them at test time. The approach can be based on the notion that the few-shot generation capability of humans develops from their past visual experiences. For example, a person can better imagine views of a new object if the person has seen many different object classes in the past. Using such an approach, a FUNIT model can be trained using a dataset containing images of many different object classes for simulating these past visual experiences. Specifically, the model can be trained to translate images from one class to another class by leveraging few input images of the target class. By learning to extract appearance patterns from the few input images for the translation task, the model learns a generalizable appearance pattern extractor that can be applied to images of unseen classes at translation time for a few-shot image-to-image translation task. In at least some embodiments, performance of such a few-shot translation approach improves as the number of classes in the training set increases. For discussion purposes herein, the source class will refer to an object class included in the training data that includes the desired pose, or other such aspect, of an object of the source class. A target class will refer to an object class that is not included in the training data, and is only seen at the time for testing, transformation, or inference.

An image translation framework in accordance with various embodiments can be based on a Generative Adversarial Networks (GAN). The use of an adversarial training scheme coupled with a specific type of network design can achieve the desired few-shot unsupervised image-to-image translation capability. Unsupervised and/or unpaired image-to-image translation can attempt to learn a conditional image generation function that can map an input image of a source class to an analogous image of a target class without pair supervision. Such an approach may not be sufficient as it attempts to recover the joint distribution using samples from marginal distributions. To deal with the problem, conventional approaches use additional constraints, such as to enforce the translation to preserve certain properties of the source data, such as pixel values, pixel gradients, semantic features, class labels, or pairwise sample distances. Other approaches are utilized as well.

Approaches in accordance with various embodiments utilize a partially-shared latent space assumption designed for a few-shot unsupervised image-to-image translation task. While capable of generating realistic translation outputs, conventional unsupervised image-to-image translation models are limited in at least two aspects. First, these models are sample inefficient, generating poor translation outputs if only few images are given at training time. Second, the learned models are limited to translating images between two classes. A trained model for one translation task cannot be directly reused for a new task despite similarity between the new task and the original task. For example, a husky-to-cat translation model cannot be re-purposed for husky-to-tiger translation, even though a cat and a tiger may share a great similarity. While some conventional approaches utilize an unsupervised image-to-image translation framework for partially addressing the first aspect, approaches in accordance with various embodiments assume many source class images but few target class images. Moreover, it can be assumed that the few target class images are only available at test or translation time, and can be from many different object classes.

Multi-class unsupervised image-to-image translation extends the unsupervised image-to-image translation methods to multiple classes. Approaches in accordance with various embodiments utilize a training dataset consisting of images of multiple classes, but instead of translating images among the observed classes, the focus is placed on translating images of these observed classes to analogous images of previously unseen classes.

A FUNIT framework in accordance with various embodiments can map an image of a source class to an analogous image of an unseen target class by leveraging a few target class images that are made available at the time for translation. The training data can consist of unpaired images from a set of object classes (e.g., images of various breeds of dogs and cats), which are referred to herein as the source classes. These images can be used to train an unsupervised image-to-image translation model, translating images between any two source classes. During testing, a few images from a novel object class (e.g., a mountain lion class), referred to as the target class, can be provided as input to the model. The model can leverage the few target images to translate any source class image to an analogous image of the target class.

A FUNIT framework in accordance with various embodiments can include a conditional image generator, G, and a multi-task adversarial discriminator, D. Unlike conditional image generators in conventional unsupervised image-to-image translation frameworks which take one image as input, a generator in accordance with various embodiments can simultaneously accept as input a content image, x, belonging to a first class, and a set of images $(y_1, \ldots, y_K)$ belonging to a second class. An output image can be produced via the following equation:

$$\bar{x} = G(x, \{y_1, \ldots, y_K\})$$

It can be assumed that the content image belongs to destination object class while each of the K class images belongs to the source object class. The generator can to map an input content image to an output image, such that the output image has the appearance of an image belonging to destination object class but with a pose of the source object class, where the source and destination objects share at least some structural similarity. During training, the generator can learn to translate images between two randomly sampled source classes. At translation time, the generator can accept as input one or a few images from an unseen target class as the destination class images, and map an image sampled from any of the source classes to an analogous image of the target or destination class.

Figure 2:
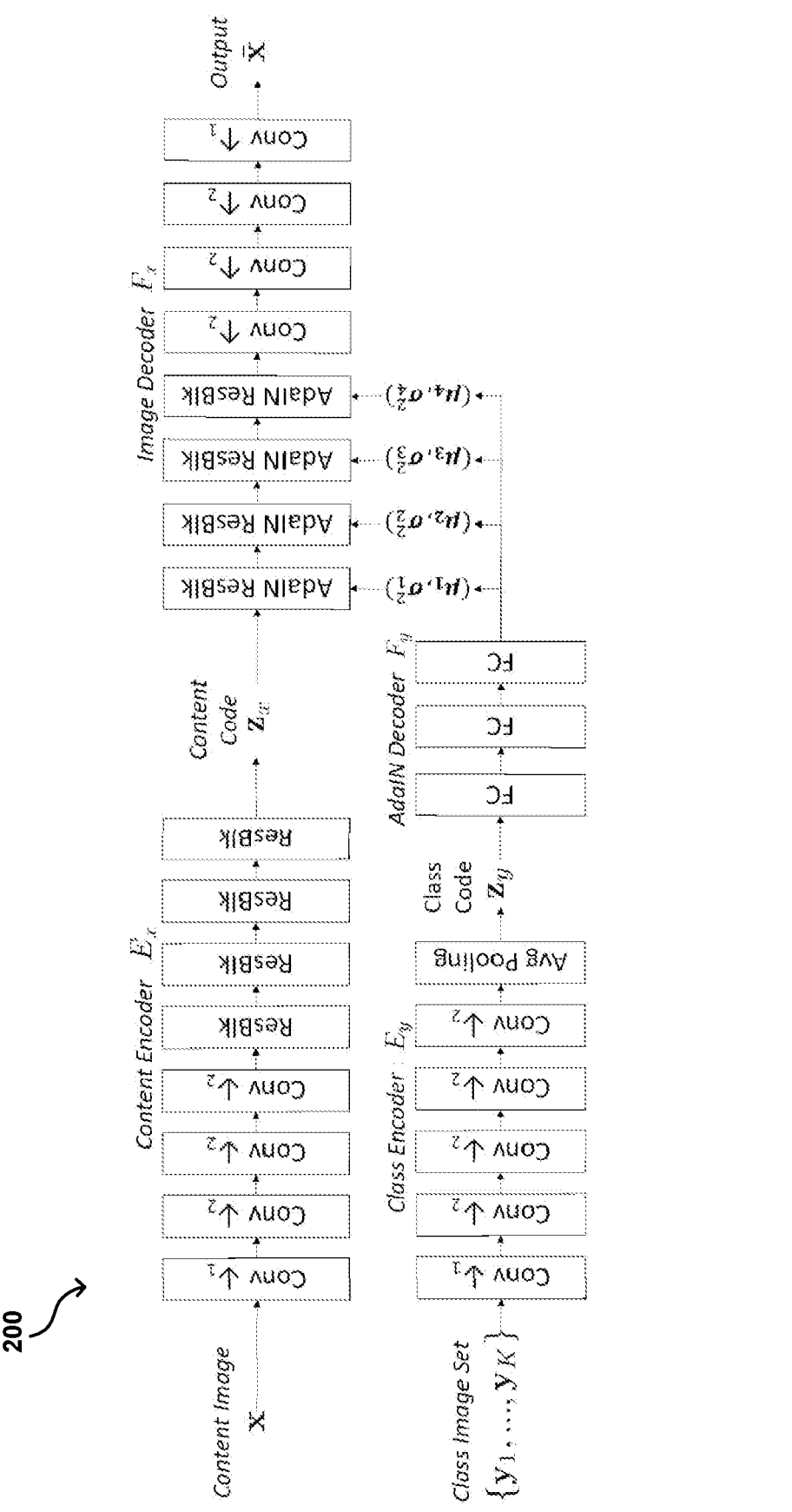
FIG. 2 illustrates components of an example image translation network that can be utilized in accordance with various embodiments.

FIG. 2 illustrates components of an example FUNIT framework 200 that can be utilized in accordance with various embodiments. As mentioned, a training set can consist of images of various object classes, or source classes. A model, such as a GAN, can be trained to translate images between any or all of these source object classes. In deployment, the trained model can receive as input very few images of the target class, which is sufficient to translate images of source classes to one or more analogous images of the target class. An example FUNIT generator can accept as input a content image and one or more target class images. The generator can generate a translation of the input content image that resembles, or has an appearance of, the image(s) of the target class. As illustrated in FIG. 2, the FUNIT generator can accept as input an image of a first object class and a set of images of a second object class, and can generate a translation output. The translation output should resemble images of the second object class and share the same class-invariant appearance with the input image.

An example generator G consists of four primary components: a content encoder, a class encoder, an adaptive instance-norm (AdaIN) decoder, and an image decoder Instance-norm and rectified linear units (ReLUs) can be applied to each convolutional and fully-connected layer of the network. The content encoder can contain several convolutional layers followed by several residual blocks. The content encoder can map an input content image, x, to a spatially distributed feature map $z_x$, referred to herein as the content latent code. The class encoder can comprise several convolutional layers followed by an average pooling layer. The class encoder can accept the class images as input and outputs a class latent code. The average pooling layer can average activations first across spatial dimensions (e.g., height and width) and then across the set of images. The image decoder can comprise several AdaIN residual blocks followed by a couple of upscale convolutional layers. The AdaIN residual block can be a residual block using the AdaIN layer as the normalization layer. For each sample, the AdaIN layer (also referred to as a normalization layer) can first normalize the activations in each channel to a zero mean and unit variance distribution. The normalization layer can then transform the distribution, through a de-normalization process, to have specific mean and variance values. A primary goal of the image decoder is to decode the content latent code and the class latent code to generate a translation of the input content image. In some embodiments the AdaIN decoder is a multilayer perceptron. It decodes the class latent code to a set of mean and variance vectors that are used as the new means and variances for the respective channels in the respective AdaIN residual block in the image decoder. Using such a generator design, a class-invariant latent representation (e.g., an object pose) can be extracted using the content encoder, and a class-specific latent representation (e.g., an object appearance) can be extracted using the class encoder. By feeding the class latent code to the image decoder via the AdaIN layers, the class images are enabled to control the spatially invariant means and variances, while the content image determines the remaining information. At training time, the class encoder can learn to extract a class-specific latent representation from the images of the source classes. At testing or translation time, this generalizes to images of previously unseen class.

An example multi-task adversarial discriminator D is trained by solving multiple adversarial classification tasks simultaneously. The discriminator in some embodiments is a patch GAN discriminator that can render an output spatial map for an input image, where each entry in the map indicates the score for the corresponding patch in the input image. Each of the tasks to be solved can be a binary classification task in some embodiments, determining whether an input image to D is a real image of a source class or a translation output coming from the generator. As there are a number of source classes, the discriminator can be designed to produce a corresponding number of outputs. When updating D for a real image of source class, D can be penalized if a certain output is negative. For a translation output yielding a fake image of the source class, D can be penalized if a corresponding output is positive. D may not be penalized for not predicting negatives for images of other classes. When updating the generator G, G may only be penalized if the specified output of D is negative. The discriminator D can be designed in some embodiments based on a class-conditional discriminator that consists of several residual blocks followed by a global average pooling layer. The feature produced by the global average pooling layer is called the discriminator feature, from which classification scores can be produced using linear mappings.

An example FUNIT framework can be trained by solving a minimax optimization problem given by:

$$\min_{D}\max_{G} L_{GAN}(D,\,G) + \lambda_R L_R(G) + \lambda_{FM} L_{FM} + \lambda_{GP} L_{GP}(D)$$

where $L_{GAN}$, $L_R$, $L_{FM}$, and $L_{GP}$ are the GAN loss, content reconstruction loss, feature matching loss, and gradient penalty loss, respectively. The scalars, $\lambda_R$, $\lambda_{FM}$, and $\lambda_{GP}$ control the relative importance of the terms, and their values are set to 0.1, 1, and 10, respectively. The GAN loss can be a conditional loss. The discriminator can be trained to predict a value such as "true" for a real image and "false" for a translation output, while the generator can be trained to make the discriminator predict true for an appropriate translation output.

In some embodiments FUNIT model training can be regularized using the image reconstruction loss. Specifically, when using the same image as the input content image and input class image, the model should generate an output image identical to the input. Feature matching loss $L_{FM}$ can be used to further improve the few-shot translation performance. Specifically, a feature extractor, referred to as $D_f$, can be constructed by removing the last (i.e., prediction) layer from D. $D_f$ can be used to extract features from the translation output and the class images and minimize the L1 loss given. A zero-centered gradient penalty loss can be applied to real images for a more stable GAN training in some embodiments. This can involve penalizing the discriminator for having a non-zero gradient field.

Figure 3:
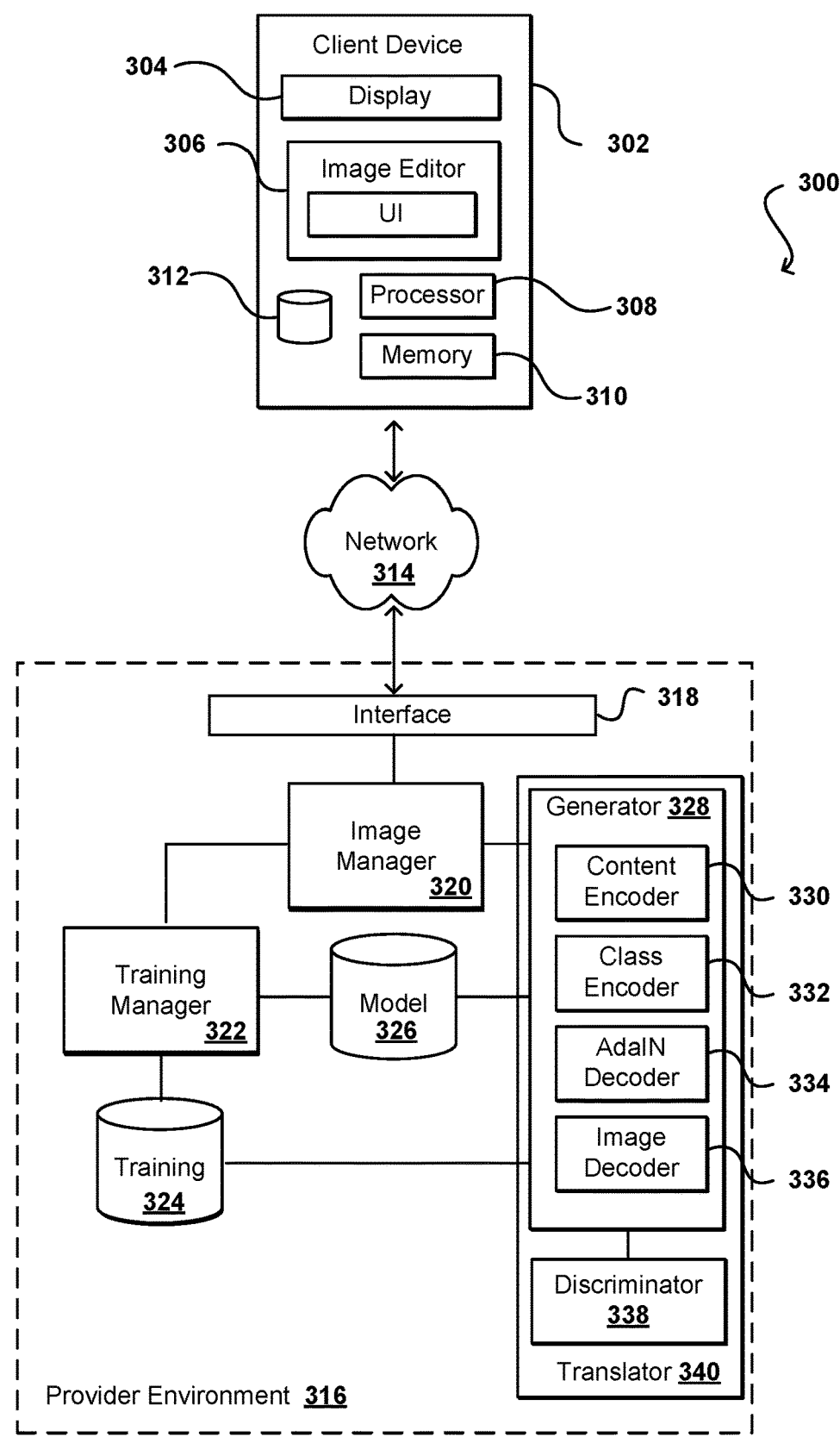
FIG. 3 illustrates an example system that can be utilized to perform an image translation in accordance with various embodiments.

FIG. 3 illustrates an example environment 300 that can be utilized to implement aspects of the various embodiments. In some embodiments, a user may utilize a client device 302 to provide an input image, which may be an image including a representation of an object that has not previously been encountered by an image generator network 328 as discussed herein. The user may also utilize the client device to select an image indicating a target pose for which a translation is to be performed for the object in the input image. The client device can be any appropriate computing device capable of enabling a user to select and/or provide images for processing, such as may include a desktop computer, notebook computer, smart phone, tablet computer, computer workstation, gaming console, and the like. A user can select, provide, or otherwise specify the transformation input a user interface (UI) of an image editor application 306 (or other image manipulation or generation software package) running on the client device, although at least some functionality may also operate on a remote device, networked device, or in "the cloud" in some embodiments. The user can provide input to the UI, such as through a touch-sensitive display 304 or by moving a mouse cursor displayed on a display screen, among other such options. As mentioned, the user may be able to provide an input image of a target class, and may select an image indicating a desired pose or other such aspect, which may be exhibited by an object in an image of a source class. The client device can include at least one processor 308 (e.g., a CPU or GPU) to execute the application and/or perform tasks on behalf of the application, and memory 310 for including the non-transitory computer-readable instructions for execution by the processor. Images provided to, or generated via, the application can be stored locally to local storage 312, such as a hard drive or flash memory, among other such options.

In some embodiments, input images received or selected on the client device 302 can be processed on the client device in order to generate an image with the desired translation, such as to apply the appearance of a target image to a pose extracted from a set of source images. In other embodiments, the client device 302 may send the input images, data extracted from the images, or data specifying the images over at least one network 314 to be received by a remote computing system, as may be part of a resource provider environment 316. The at least one network 314 can include any appropriate network, including an intranet, the Internet, a cellular network, a local area network (LAN), or any other such network or combination, and communication over the network can be enabled via wired and/or wireless connections. The provider environment 316 can include any appropriate components for receiving requests and returning information or performing actions in response to those requests. As an example, the provider environment might include Web servers and/or application servers for receiving and processing requests, then returning data or other content or information in response to the request.

Communications received to the provider environment 316 can be received to an interface layer 318. The interface layer 318 can include application programming interfaces (APIs) or other exposed interfaces enabling a user to submit requests to the provider environment. The interface layer 318 in this example can include other components as well, such as at least one Web server, routing components, load balancers, and the like. Components of the interface layer 318 can determine a type of request or communication, and can direct the request to the appropriate system or service. For example, if a communication is to train an image translation network for classes of image content, such as birds, animals, or people, the communication can be directed to an image manager 320, which can be a system or service provided using various resources of the provider environment 316. The communication, or information from the communication, can be directed to a training manager 322, which can select an appropriate model or network and then train the model using relevant training images and/or data 324. Once a network is trained and successfully evaluated, the network can be stored to a model repository 326, for example, that may store different models or networks for different types of image translation or processing. If a request is received to the interface layer 318 that includes input to be used for an image translation, information for the request can be directed to an image generator 328, also referred to herein as part of an image translation network or service, that can obtain the corresponding trained network, such as a trained generative adversarial network (GAN) as discussed herein, from the model repository 326 if not already stored locally to the generator 328. The image generator 328 can take as input the target image (or few images) and data indicating the target pose, as may be exhibited by a selected source image as discussed herein. The image generator 328 can then cause the input to be processed to generate an image representing the target transformation. As mentioned, this can involve the input being processed by the content encoder 330 to extract a class-invariant latent representation, such as may correspond to the selected pose. The class encoder 332 can extract the class-specific latent representation (e.g., an object appearance) from the input target image. The class latent code can be fed to AdaIN decoder 334, which decodes the class latent code to a set of mean and variance vectors that are used as the new means and variances for the respective channels in the respective AdaIN residual block in the image decoder 336. The generated image can then be transmitted to the client device 302 for display on the display element 304, or for other such usage. If the user wants to modify any aspects of the image, the user can provide additional input to the application 306, which can cause a new or updated image to be generated using the same process for the new or updated input, such as an additional image of the target class or specification of a different pose, among other such options. In some embodiments, an image generation network can utilize a deep generative model that can learn to sample images given a training dataset. The models used can include, for example, generative adversarial networks (GANs) and variational auto-encoder (VAE) networks while aiming for an image translation task. An image translation network, or translator 340, can comprise a GAN in various embodiments that consists of a generator 328 and a discriminator 338. The generator 328 can be used to produce translated images so that the discriminator cannot differentiate between real and generated.

In various embodiments the processor 308 (or a processor of the training manager 322 or image translator 340) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

FIG. 4 illustrates an example process 400 for generating an image representing a translation of a representation of a previously unseen object to have a pose learned from a known source object class that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, while pose is used as a primary example, there can be other aspects of the source image class that are utilized to generate a transformation of an input object as discussed and suggested herein. In this example, an input digital image is received 402, or otherwise obtained or specified, that includes a representation of an object of interest. In this example, the object is of a target class that has not yet been encountered by a neural network to be used to process the image, or at least is of a type that was not used to train the network. A selection of a source image can also be obtained 404, where the source image includes a representation of a source object of an object class that was used to train the neural network. In some embodiments a user might select the source object, while in others the system or network may select a source image or pose, among other options discussed and suggested herein.

Once obtained, the input image and source image (or indication of the source image) can be provided 406 as input to the trained neural network. As discussed herein, the network can have been trained using many images of multiple object classes, including the source class, learning to translate between objects of the various classes. One or more encoders of a generator of the network can extract 408 a class-invariant latent representation corresponding to the target pose from the source image or class. A class-specific latent representation can also be extracted 410 that corresponds to an appearance of the target object from the input image. The neural network can then be used to infer 412, based at least in part upon these latent representations, a translated image including a representation of an object of the target class having the target pose. As mentioned, such a process can produce a quality translated image without requiring a large number of input images of the target class.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate: speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 5:
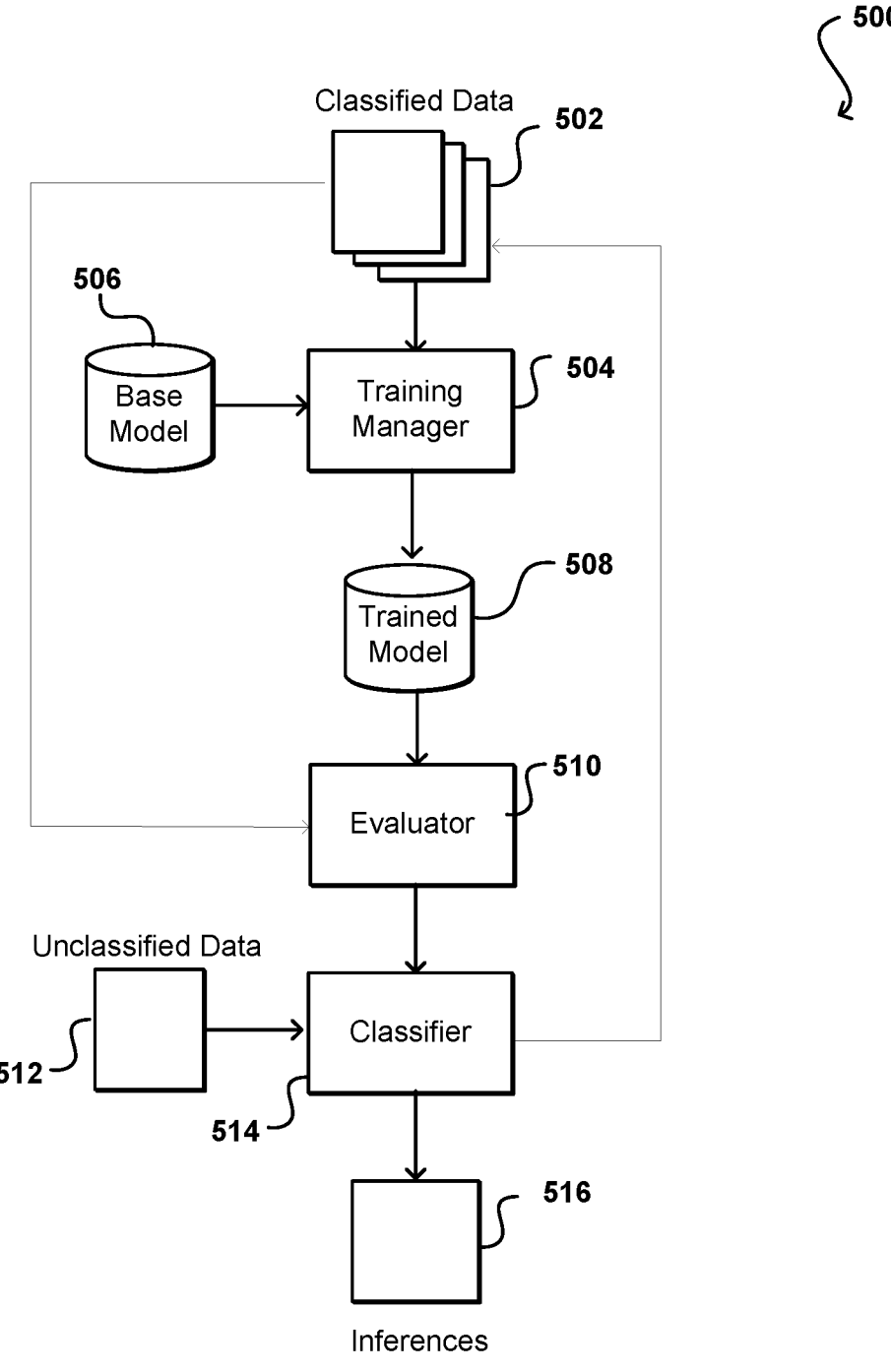
FIG. 5 illustrates an example system for training an image synthesis network that can be utilized in accordance with various embodiments.

FIG. 5 illustrates an example system 500 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 502 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 502 in this example is provided as training input to a training manager 504. The training manager 504 can be a system or service that includes hardware and software, such as one or more computing devices executing a training application, for training the statistical model. In this example, the training manager 504 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 504 can select a base model, or other untrained model, from an appropriate repository 506 and utilize the classified data 502 to train the model, generating a trained model 508 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 508 can be provided for use by a classifier 514 in classifying unclassified data 512. In many embodiments, however, the trained model 508 will first be passed to an evaluator 510, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the classified data 502 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 508 and the evaluator 510 can determine the accuracy of the model by comparing the ground truth data against the corresponding output (or predictions/observations) of the model. The evaluator 510 in some embodiments can provide a summary or performance metric indicating how well the predicted and true values match. If the trained model does not satisfy at least a minimum performance criterion, or other such accuracy threshold, then the training manager 504 can be instructed to perform further training, or in some instances try training a new or different model, among other such options. If the trained model 508 satisfies the relevant criteria, then the trained model can be provided for use by the classifier 514.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables.

The resulting features can be fed to the learning algorithm to build models and evaluate the quality of the models on data that was held out from model building. The model can then be used to generate predictions of the target answer for new data instances.

In the example system 500 of FIG. 5, the trained model 510 after evaluation is provided, or made available, to a classifier 514 that is able to use the trained model to process unclassified data. This may include, for example, data received from users or third parties that are not classified, such as query images that are looking for information about what is represented in those images. The unclassified data can be processed by the classifier using the trained model, and the results 516 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 508 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 6:
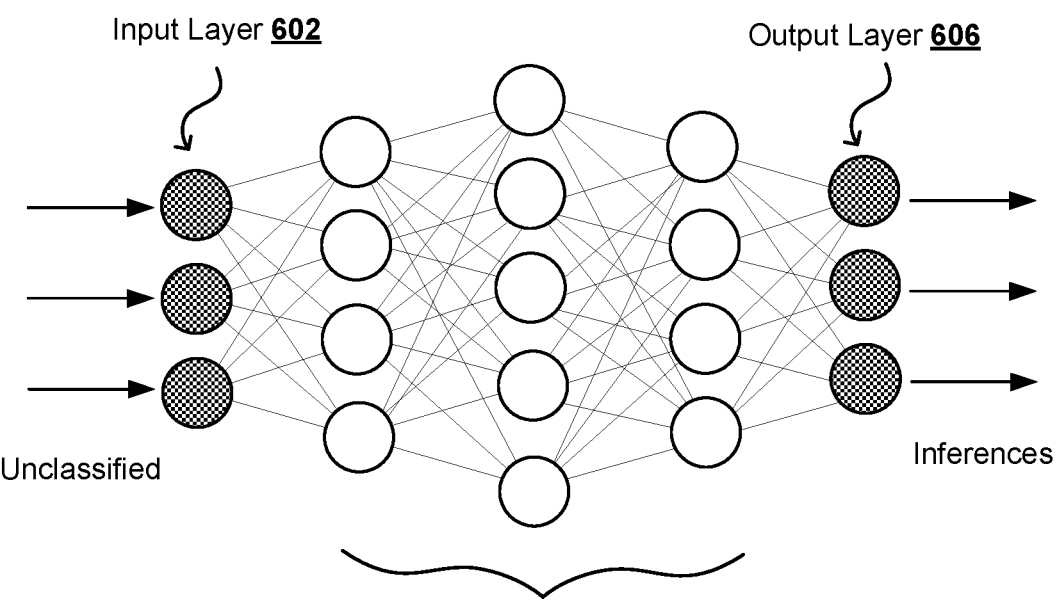
FIG. 6 illustrates layers of an example statistical model that can be utilized in accordance with various embodiments.

FIG. 6 illustrates an example neural network 600, or other statistical model, that can be utilized in accordance with various embodiments. In this example the statistical model is an artificial neural network (ANN) that includes a multiple layers of nodes, including an input layer 602, an output layer 606, and multiple layers 604 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

FIG. 7 illustrates a set of basic components of a computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the processor 702, the same or separate storage can be used for images or data, a removable memory can be available for sharing information with other devices, and any number of communication approaches can be available for sharing with other devices. The device typically will include some type of display element 706, such as a touch screen, organic light emitting diode (OLED) or liquid crystal display (LCD), although devices such as portable media players might convey information via other means, such as through audio speakers. As discussed, the device in many embodiments will include at least communication component 708 and/or networking components 710, such as may support wired or wireless communications over at least one network, such as the Internet, a local area network (LAN), Bluetooth®, or a cellular network, among other such options. The components can enable the device to communicate with remote systems or services. The device can also include at least one additional input device 712 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
using one or more neural networks to generate one or more images of one or more first objects based, at least in part, on one or more pose-independent features of the one or more first objects and one or more poses of one or more second objects,
wherein the one or more neural networks comprise a generative adversarial network (GAN) including a conditional image generator and a multi-task adversarial discriminator.

2. The computer-implemented method of claim 1, further comprising:
extracting a class-invariant representation of the one or more poses using a content encoder of the conditional image generator; and
extracting a class-specific latent representation of an appearance of the one or more first objects using a class encoder of the conditional image generator.

3. The computer-implemented method of claim 1, further comprising:
normalizing, by a normalization layer of the multi-task adversarial discriminator, layer activations to zero mean and unit variance distribution; and
de-normalizing the normalized layer activations using an affine transformation.

4. The computer-implemented method of claim 1, further comprising:
performing adversarial training of the one or more neural networks to translate poses between a plurality of object classes.

5. The computer-implemented method of claim 1, comprising:
receiving a digital representation of one or more additional images of the one or more first objects; and
inferring, using the one or more neural networks, the one or more images of the one or more first objects, wherein the conditional image generator and the multi-task adversarial discriminator are to extract a class-invariant representation of the one or more poses and a class-specific representation of an appearance of the one or more first objects.

6. The computer-implemented method of claim 1, wherein the one or more neural networks were not trained using images of an object class of the one or more first objects.

7. The computer-implemented method of claim 1, further comprising:
performing unsupervised training of the one or more neural networks using a training data set comprising a plurality of images of multiple object classes, wherein the one or more neural networks learn to translate poses between the multiple object classes.

8. The computer-implemented method of claim 3, further comprising:
feeding class latent code to an adaptive instance-norm (AdaIN) decoder to decode the class latent code to a set of mean and variance vectors functioning as new means and variances of respective channels in a respective AdaIN residual block of an image decoder of the one or more neural networks.

9. The computer-implemented method of claim 1, wherein the conditional image generator includes a content encoder comprising a plurality of first convolutional layers followed by a plurality of residual blocks, and wherein the conditional image generator includes a class encoder comprising a plurality of second convolutional layers followed by an average pooling layer.

10. The computer-implemented method of claim 9, further comprising: causing the average pooling layer to average activations across spatial dimensions before averaging activations across a set of images.

11. A system, comprising:
at least one processor; and
memory including instructions that, if executed by the at least one processor, cause the system to use one or more neural networks to generate one or more images of one or more first objects based, at least in part, on one or more pose-independent features of the one or more first objects and one or more poses of one or more second objects,
wherein the one or more neural networks comprise a generative adversarial network (GAN) including a conditional image generator and a multi-task adversarial discriminator.

12. The system of claim 11, wherein the one or more neural networks were not trained using images of an object class of the one or more first objects.

13. The system of claim 11, wherein the instructions, if executed by the at least one processor, further cause the system to:

perform unsupervised training of the one or more neural networks using a training data set comprising a plurality of images of different object classes, wherein the one or more neural networks learn to translate poses between the different object classes.

14. The system of claim 11, wherein the instructions, if executed by the at least one processor, further cause the system to:

extract a class-invariant representation of the one or more poses using a content encoder of the conditional image generator included in the one or more neural networks; and extract a class-specific latent representation of an appearance of the one or more first objects using a class encoder of the conditional image generator.

15. The system of claim 11, wherein the instructions, if executed by the at least one processor, further cause the system to:

normalize, by a normalization layer of the multi-task adversarial discriminator included in the one or more neural networks, layer activations to zero mean and unit variance distribution;

and de-normalize the normalized layer activations using an affine transformation.

16. A processor, comprising:

one or more circuits to use one or more neural networks to generate one or more images of one or more first objects based, at least in part, on one or more pose-independent features of the one or more first objects and one or more poses of one or more second objects, wherein the one or more neural networks comprise a generative adversarial network (GAN) including a conditional image generator and a multi-task adversarial discriminator.

17. The processor of claim 16, wherein:

the one or more neural networks were trained using one or more additional images depicting the one or more second objects; and the one or more neural networks were not trained using images depicting the one or more first objects.

18. The processor of claim 16, wherein:

the one or more circuits are to use the one or more neural networks to extract a representation of the one or more poses from one or more images of the one or more second objects; and the one or more circuits are to use the one or more neural networks to generate the one or more images of the one or more first objects based, at least in part, on the extracted representation of the one or more poses.

19. The processor of claim 16, wherein the one or more circuits are to use the one or more neural networks to generate the one or more images of the one or more first objects based, at least in part, on a set of spatially invariant mean and variance vectors generated according to the one or more pose-independent features.

20. The processor of claim 16, wherein the one or more circuits are to:

extract a class-invariant representation of the one or more poses using a content encoder of the conditional image generator; and extract a class-specific latent representation of an appearance of the one or more first objects using a class encoder of the conditional image generator.

21. The processor of claim 16, wherein the one or more circuits are to:

normalize, by a normalization layer of the multi-task adversarial discriminator, layer activations to zero mean and unit variance distribution; and de-normalize the normalized layer activations using an affine transformation.

* * * * *